US005353919A

United States Patent [19]

Buchner et al.

[11] Patent Number: 5,353,919

[45] Date of Patent: Oct. 11, 1994

[54] DEVICE FOR SUPPORTING A CONVEYING ROLLER OF A ROLLER KILN

[75] Inventors: Günter Buchner, Nürnberg; Volker Rieck, Schwanstetten; Friedherz Becker, Wendelstein, all of Fed. Rep. of Germany

[73] Assignee: Riedhammer GmbH und Co. KG, Nuremberg, Fed. Rep. of Germany

[21] Appl. No.: 150,459

[22] Filed: Nov. 10, 1993

[30] Foreign Application Priority Data

Nov. 10, 1992 [DE] Fed. Rep. of Germany ....... 4237862

[51] Int. Cl.$^5$ .............................................. B65G 13/06

[52] U.S. Cl. ...................................... 198/789; 193/37

[58] Field of Search ............... 198/780, 789, 790, 791; 193/37; 432/236, 246

[56] References Cited

U.S. PATENT DOCUMENTS

| | | | |
|---|---|---|---|
| 3,867,748 | 2/1975 | Miller | 198/789 X |
| 4,242,782 | 1/1981 | Hannenken et al. | 198/789 X |
| 4,343,395 | 8/1982 | Lippert et al. | 198/789 X |
| 4,399,598 | 8/1983 | Page et al. | 432/246 |
| 5,119,922 | 6/1992 | Yamaguchi | 198/789 |

FOREIGN PATENT DOCUMENTS

| | | | |
|---|---|---|---|
| 0052983 | 2/1990 | Japan | 432/246 |
| 0607975 | 12/1978 | Switzerland | 198/791 |

*Primary Examiner*—James R. Bidwell
*Attorney, Agent, or Firm*—John F. A. Earley; John F. A. Earley, III

[57] ABSTRACT

The present invention pertains to a device for supporting a conveying roller of a roller kiln.

13 Claims, 1 Drawing Sheet

FIG. 1
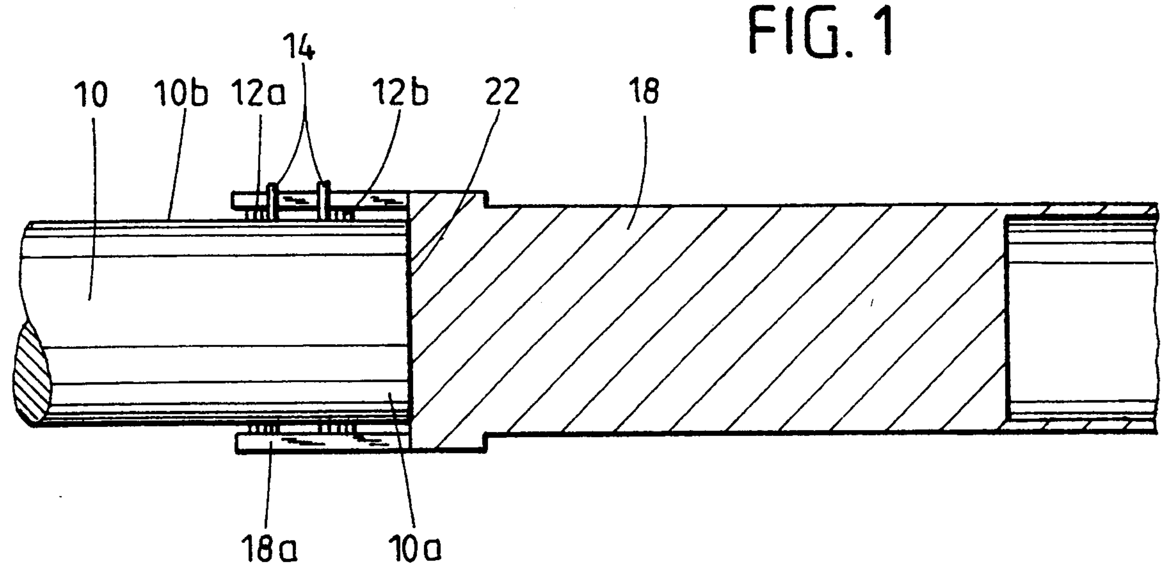
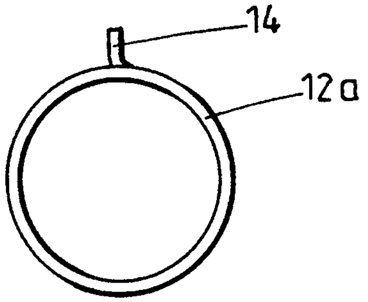
FIG. 2
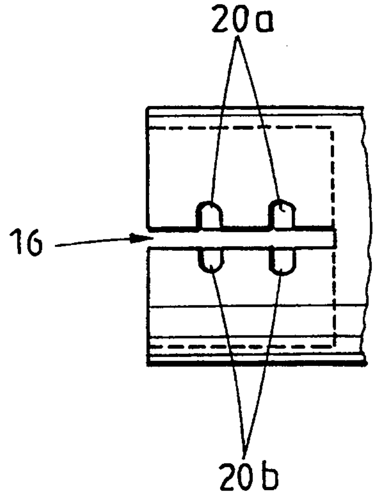
FIG. 3

DEVICE FOR SUPPORTING A CONVEYING ROLLER OF A ROLLER KILN

The present invention pertains to a device for supporting a conveying roller of a roller kiln, sometimes called roller hearth kiln.

Roller kilns have been known for a long time and have been used, e.g., in the ceramic industry. The product is guided on conveying rollers, which are arranged, at spaced locations from one another, along a kiln path on a horizontal plane one behind the other. The individual conveying rollers extend at right angles to the kiln channel and consequently at right angles to the conveying direction of the material up to the side walls of the kiln, into the walls, or through the said walls, and are guided at the end via corresponding bearings, e.g., roller bearings, and are set into rotary movement via a drive, e.g., a chain drive, together or in groups.

The rollers may all rotate at equal speed, e.g., when a common drive is used; however, it is also possible to drive individual groups of rollers at different speeds in order to achieve separation of the material being fired, which is being conveyed on the rollers, e.g., in the area of the sintering zone.

The kiln channel is delimited by a bottom and a ceiling, and burners or electrical heating elements for heating or firing the furnace are arranged over the different kiln zones (heat-up zone, firing zone, cooling zone).

The individual rollers are longer or shorter, depending on the cross section of the kiln. There are mechanical problems especially in the case of long rollers, mainly in the high-temperature areas of the furnace. Even though special materials, e.g., those based on silicon carbide, are frequently used at present to manufacture these rollers, it is not always possible to prevent the rollers with certainty from having certain tolerances, especially due to reasons related to manufacture, or from undergoing deformation during the kiln operation.

The connection of the free ends of the rollers to the corresponding drive mechanism represents a special kind of problem in this connection. Rigid mechanical connection is undesirable, because tolerances, e.g., in the roller cross section, cannot always be equalized with certainty, and, on the contrary, they may even lead to undesirable mechanical stresses, which may sometimes even cause rupture of rollers.

Even though an "elastic connection" would be desirable, possibilities for the technical realization of such a connection are not yet available.

Therefore, the basic task of the present invention is to provide a device for supporting a conveying roller of a roller kiln, which makes possible a certain "elasticity" in the area in which the conveying roller is connected to the drive mechanism and is, above all, also able to compensate tolerances in the geometry of the conveying roller or changes in the position of the conveying roller during the furnace operation.

The present invention suggests, for this purpose, a device for supporting a conveying roller of a roller kiln with the following characteristics:

At least one annular body, which has at least one radially outwardly projecting, pin-like projection, is arranged around the drive-side, free end of the conveying roller. If the conveying roller is driven on both sides, the opposite end of the conveying roller should preferably also be designed correspondingly. This also applies to the following characteristics of the device.

The free end of the conveying roller is enclosed by a tubular adapter. "Enclosed" means here that the tubular adapter reaches over the corresponding free end of the conveying roller.

The adapter has axially extending grooves, whose number and position correspond to the number and position of pin-like projections. The term "groove" is defined, as will be explained below, such that the groove is provided either only on the inside of the tubular adapter, or it is also open radially to the outside.

Each groove extends from the free end of the adapter at least partially in the direction of the corresponding roller end. The maximum length of the groove consequently corresponds to the depth over which the adapter reaches over the free end of the conveying roller in the axial direction.

Along its longitudinal extension, each groove has at least one tangential bulge designed opposite the direction of rotation of the conveying roller, which is used to receive the corresponding pin-like projections of the body. "Tangential" means here that the bulge is arranged at right angles to the longitudinal extension of the groove.

The adapter can be coupled with a drive mechanism at its opposite end. The type of the drive mechanism is independent of the described device for supporting the conveying roller, so that the person skilled in the art can resort to prior-art drive mechanisms, as described in, e.g., DE 31 40 645.

The conveying roller is connected to the adapter in terms of drive according to the present invention not by a rigid mechanical connection, but the torque is transmitted from the driven adapter indirectly to the conveying roller via the pin-like projection of the annular body in cooperation with the bulge, which acts as a stop for the projection.

It is obvious that dimensional tolerances of the conveying roller and/or of the adapter can thus be "absorbed" within certain limits, so that a type of "elastic coupling" is provided.

It should be pointed out here that the axially extending grooves have only the task of guiding the pin-like projections into the area of the bulges, which act, as was described, as stops, during the assembly of the device.

According to an embodiment, the groove ( s ) and the bulge(s) are provided with an opening width which is somewhat larger than the cross section of the corresponding projection. This makes it easier to assemble the device (the coupling of the conveying roller and the adapter), on the one hand, and, on the other hand, further possibilities of compensating dimensional tolerances are created.

The annular body may have various designs and may be attached to the conveying roller in different manners.

According to a first embodiment, the annular body (including its radial projection) is heat-shrunk onto the conveying roller. Such heat-shrinking processes, especially for metallic materials, have been known from other technical areas. The body is first heated, so that its internal dimension becomes somewhat larger than the external dimension of the conveying roller. This heating is performed, e.g., inductively. The body is pushed in this state axially onto the conveying roller. The body shrinks during the subsequent cooling and thus comes into nonpositive contact with the surface of the conveying roller.

According to another embodiment, which particularly enhances the "elasticity" of the coupling device, which is desired according to the task, the annular body consists of a spring steel plate, which is wound on the conveying roller in the direction of rotation of the conveying roller, and whose free end forms the pin-like projection.

The spring steel ring is first wound (in a plurality of layers) "loosely." "Self-tensioning" and consequently transmission of the drive forces and torques is achieved at the moment when the projection comes into contact with the corresponding inner surface of the bulge. The spring steel ring is then tensioned and locked in its direction of rotation. At the same time, dimensional tolerances, especially of the conveying roller, can be compensated particularly simply and reliably.

If desired, a plurality of such annular bodies with corresponding projections, arranged at spaced locations from one another, may be arranged at the drive-side end (or at both ends) of the conveying roller.

Since roller kilns of this class are also frequently operated in reversing operation (i.e., with reverse direction of rotation of the conveying rollers), the second, annular body is also formed, according to an advantageous embodiment of the present invention, from a spring steel plate wound on the conveying roller, but winding is performed in the direction opposite the direction of winding of the first body. In this case, the adapter has a second "tangential" bulge on the side of the groove opposite the first bulge, because the self-tensioning of the spring steel plate is possible only in the reverse direction during reversing operation.

However, if the embodiment described at the beginning with a heat-shrunk annular body is used, it is sufficient to arrange a second bulge, which will then act as a stop edge for the radially extending projection of the body, directly opposite the first bulge on the other side of the groove.

Assembly of the device is facilitated by the fact that the groove(s) and the bulge(s) are open radially to the inside and to the outside. In other words, the groove have the shape of a slot extending in the axial direction of the adapter in this case. This embodiment makes possible the simplified introduction of the pin-like projections of the corresponding bodies into the groove(s) and bulge(s) when the projections project over the groove(s) and bulge(s) in the outwardly direction, because the projections can now be guided manually.

However, it is also possible and technically meaningful to design the groove(s) and bulge(s) as groove(s) and bulge(s) that are closed to the outside, so that the groove extends into the area that extends over the free end of the conveying roller only along the inner surface of the adapter.

The device according to the present invention is basically not subject to any limitations concerning the selection of the materials for the individual components. However, materials such as silicon-infiltrated silicon carbide (SiSiC) have proved to be particularly successful. The adapter may consist of metal.

Finally, to create a reliable connection between the adapter and the conveying roller, the adapter has a stop on the inside for the conveying roller at its end projecting over the conveying roller according to another embodiment of the present invention. This stop is aligned such that the radial projections of the bodies are located directly in front of the corresponding bulges in this position.

Further characteristics of the present invention become apparent from the characteristics of the subclaims as well as the other application documents.

The present invention will be explained in greater detail below on the basis of an exemplary embodiment. In a highly schematic form, FIG. 1 shows a section through a conveying roller engaging an adapter, FIG. 2 shows a side view of the body arranged on the conveying roller for transmitting force and torque, and FIG. 3 shows a partial view of the section of the adapter projecting over the conveying roller with one groove and two bulges.

The free end 10*a* of a conveying roller 10 in a roller kiln (not shown) can be recognized in FIG. 1.

At spaced locations from one another, two steel springs 12*a*, 12*b*, which consist of spring steel plate and are wound in a plurality of layers on the circumferential surface 10*b* of the said conveying roller 10 in opposite direction, can be recognized at the said free end 10*a*.

FIG. 2 shows a side view of the said spring 12*a*, wherein the individual windings are not shown for clarity's sake. It can be seen that the free end 14 of the said steel spring 12*a* forms a projection radially to the said conveying roller 10, and [the said projection] is located in an axially extending groove 16 (FIG. 3) of a tubular adapter 18, and projects beyond it radially to the outside.

While the said spring 12*a* is wound in the direction of rotation of the said conveying roller 10 (which corresponds to conveyance of the material into the plane of the drawing), the said spring 12*b* is wound in the reverse direction thereto.

At its end that is the left-hand end in FIG. 1, the said adapter 18 has a tubular, free end 18*a*, which extends beyond the said free end 10*a* of the said conveying roller 10 at a spaced location therefrom, as was described above. While the said springs 12*a*, 12*b* are located in the annular gap between the said adapter 18 and the said conveying roller 10, their said radial projections 14 pass through the said described groove 16 in the said section 18*a* of the said adapter 18. For assembly, the said adapter 18 was pushed beforehand onto the free end of the said conveying roller 10 from right to left, while the said radial projections 14 were guided in the said groove 16 into a position in which they are located directly in front of the bulges 20*a,b*, which are provided tangentially (in the circumferential direction) on both sides of the said groove 16. This position of the said conveying roller 10 in relation to the said adapter 18 is additionally secured by an inner stop 22 of the said adapter 18.

The opposite free end of the said adapter 18 is used for connection to a drive mechanism, with which the said tubular adapter 18 can be rotated. The drive mechanism as well as the coupling members are not specifically represented, because they can be freely selected according to the state of the art. Thus, the drive mechanism may consist of a chain drive, a gear drive, or the like.

When the said adapter 18 is rotated in the above-described direction of rotation, the said projections 14 of the said steel springs 12*a*, 12*b* are moved against the stops formed by the said bulges 20*b*. The said spring 12*a*, which was wound in the direction of rotation, is tensioned at this moment until it lies tightly on the said circumferential surface 10*b* of the said conveying roller 10 and now transmits the drive torque to the said conveying roller 10, while the said spring 12*b*, wound opposite the direction of rotation, is released, thus enabling the rotation of the said conveying roller 10 in relation to the said spring 12*a* being held stationarily.

In reversing operation (in the opposite direction of rotation), the torque is transmitted, in the reverse manner, via the said spring 12*b*, while the said spring 12*a* is released, and it does not hinder the rotation of the said conveying roller 10.

The device described has an extremely simple design and can be used to retrofit existing furnaces. It readily makes it possible to compensate tolerances, especially in the dimensional accuracy of the conveying rollers. However, any deformation of the conveying roller that may occur during the furnace operation can be compensated within certain limits as well.

At the same time, reliable transmission of force and torque from the drive to the said conveying roller 10 via the said adapter 18 is ensured.

We claim:

1. Device for supporting a conveying roller (10) of a roller kiln, the conveying roller (10) having a drive-side free end (10*a*), said device having the following characteristics:

at least one annular body (12*a*, 12*b*), which has at least one, radially outwardly projecting, pin-like projection (14), is arranged around the drive-side free end (10*a*) of the conveying roller (10), the free end (10*a*) of the conveying roller (10) is enclosed by a tubular adapter (18), the adapter (18) has axially extending grooves (16), whose number and position correspond to the number and position of the pin-like projections (14), each groove extends from the free end of the adapter (18), along its longitudinal extension, each groove (16) has at least one tangential bulge (20*b*) extending in a direction opposite the direction of rotation of the conveying roller (10), for receiving the corresponding pin-like projection (14) of the body (12*a*, 12*b*), and the adapter (18) can be coupled at its opposite end with a drive mechanism.

2. Device in accordance with claim 1, in which the grooves (16) and the bulges (20*a*, 20*b*) have an opening width which is somewhat larger than the cross section of the corresponding projections (14).

3. Device in accordance with claim 1, in which the annular body is heat-shrunk onto the conveying roller.

4. Device in accordance with claim 3, in which the annular body consists of metal.

5. Device in accordance with claim 1, in which the annular body (12*a*, 12*b*) consists of a spring steel plate, which is wound on the conveying roller (10) in the direction of rotation of the conveying roller, and the free end of which forms the pin-like projection (14).

6. Device in accordance with claim 5, in which a second annular body (12*a*) is arranged at a spaced location from the first body (12*b*), which also consists of a spring steel plate wound on the conveying roller (10), but which is wound in a direction opposite the direction of winding of the first body (12*b*), and the adapter (18) has a second tangential bulge (20*a*) on the side of the groove (16) opposite the first bulge (20*b*).

7. Device in accordance with claim 1, in which the grooves (16) and the bulges (20*a*, 20*b*) are radially open on the inside and outside.

8. Device in accordance with claim 7, in which the pin-like projection (14) extends beyond the grooves and the bulges (20*a*, 20*b*) in the outwardly direction.

9. Device in accordance with claim 1, in which the grooves and the bulges are radially outwardly closed.

10. Device in accordance with claim 1, in which the conveying roller (10) consists of a ceramic material, such as silicon carbide.

11. Device in accordance with claim 1, in which the adapter (18) consists of metal.

12. Device in accordance with claim 1, in which the adapter (18) has, on the inside, an axial stop (22) for the conveying roller (10) at its end (18*a*) extending beyond the conveying roller (10).

13. Device for supporting a conveying roller (10) of a roller kiln, the conveying roller (10) having a drive-side free end (10*a*), said device comprising at least one annular body (12*a*, 12*b*) for mounting around the drive-side free end (10*a*) of the conveying roller (10), the body having at least one, radially outwardly projecting, pin-like projection (14), a tubular adapter (18) for enclosing the driveside free end (10*a*) of the conveying roller (10), the adapter having a free end, the adapter (18) having axially extending grooves (16), whose number and position correspond to the number and position of the pin-like projections (14), each groove extending from the free end of the adapter (18), along its longitudinal extension, each groove (16) having at least one tangential bulge (20*b*) extending in a direction opposite a direction of rotation of the conveying roller (10), for receiving the corresponding pin-like projection (14) of the body (12*a*, 12*b*), and means on the adapter (18) for coupling the adapter to a drive mechanism, the groove(s) (16) and the bulge(s) (20*a*, 20*b*) having an opening width which is somewhat larger than the cross section of the corresponding projections (14), in which the annular body (12*a*, 12*b*) comprises a spring steel plate, which is wound on the conveying roller (10) in the direction of rotation of the conveying roller, and the free end of which forms the pin-like projection (14), in which a second annular body (12*a*) is arranged at a spaced location from the first body (12*b*), which also comprises a spring steel plate wound on the conveying roller (10), but which is wound in a direction opposite the direction of winding of the first body (12*b*), and the adapter (18) has a second tangential bulge (20*a*) on the side of the groove (16) opposite the first bulge (20*b*), in which the groove(s) (16) and the bulges (20*a*, 20*b*) are radially open on the inside and outside, in which the pin-like projections (14) extend beyond the groove(s) and the bulges (20*a*, 20*b*) in the outwardly direction, in which the adapter (18) consists of metal, and in which the adapter (18) has, on the inside, an axial stop (22) for engaging the conveying roller (10).

* * * * *